Aug. 19, 1952  H. G. TAYLOR  2,607,140
PACKING RING SUPPORT
Filed May 18, 1950

INVENTOR.
HAROLD G. TAYLOR.
BY Dybvig & Dybvig
His attorneys.

Patented Aug. 19, 1952

2,607,140

UNITED STATES PATENT OFFICE 2,607,140

PACKING RING SUPPORT

Harold G. Taylor, Dayton, Ohio, assignor to Plastic & Rubber Products, Inc., Dayton, Ohio, a corporation of Ohio Application May 18, 1950, Serial No. 162,750

7 Claims. (Cl. 40—10)

This invention relates to a packing ring support and more particularly to an inexpensive means for both labeling and removably supporting a series of packing rings.

Packing rings are manufactured in a large number of different sizes, and because of the difficulty and sometimes impossibility of placing labels on the packing rings themselves, it is desirable to provide some means for dating and otherwise labeling the rings and to keep rings of a given size and type together. Very frequently packing rings are stored in drawers and a large number of different size rings are placed in a single drawer, with the result that considerable difficulty is experienced in picking out the right size and type of ring.

Industry now requires many different types and sizes of rings and rings made for a particular application cannot be used in other applications, with the result that positive identification and segregation of the various types of rings are very essential.

It is an object of this invention to provide a simple and inexpensive support which not only serves to removably mount a series of packing rings but also serves as a convenient means for indicating vital information, such as the date of cure, chemical composition, size, and the name of the manufacturer of the rings.

It is another object of this invention to provide a support of the type which occupies a minimum amount of space and which can be used as a mounting for the rings during shipment.

Still another object of this invention is to provide a support which may be made so cheaply that there is no need for saving the support when the last of the rings carried by the support has been sold or used.

Other objects and advantages reside in the construction of parts, the combination thereof and the mode of operation, as will become more apparent from the following description.

Figure 1:
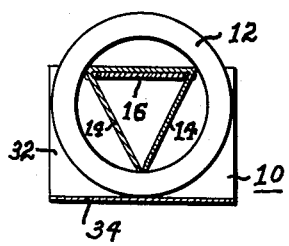
Figure 1 is a vertical sectional view taken substantially on the line 1—1 of Figure 3.

Referring now to the drawing wherein I have shown a preferred embodiment of my invention, reference numeral 10 generally designates a one-piece support for a series of packing rings 12. For convenience of description, the rings 12 will be referred to as packing rings, whereas it is to be understood that the support shown herein may be used for mounting various types of rings. The member 10 is preferably made from cardboard, but it is obvious that insofar as certain aspects of the invention are concerned, it could be made from any other suitable material, such as plastic or even light weight metal.

Figure 2:
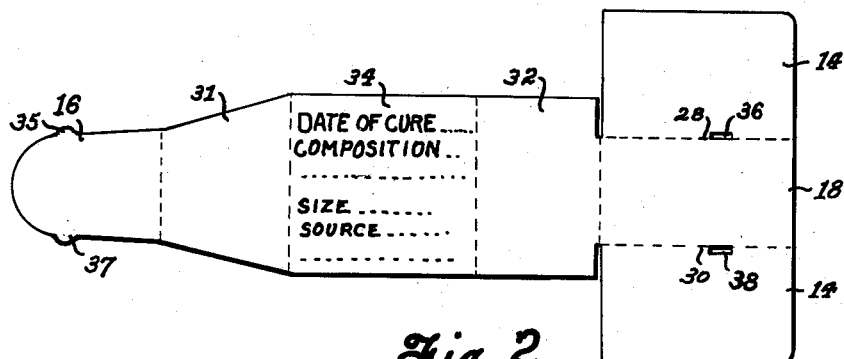
Figure 2 is a developed view of the support.

As best illustrated in Figure 2 of the drawing, the support 10 is made from a single piece of flat cardboard having a pair of core forming flanges or flaps 14 provided at its one end, as shown, and having a sealing tongue or flap 16 at its other end. The flaps 14 are bent along the dotted lines 28 and 30 so as to form a triangular core, as best shown in Figure 1. The cardboard support 10 is creased along the lines 20, 22, 24, 26, 28, and 30 so as to be readily bendable along these lines to form a support having the shape shown in Figures 1 and 3.

Figure 3:
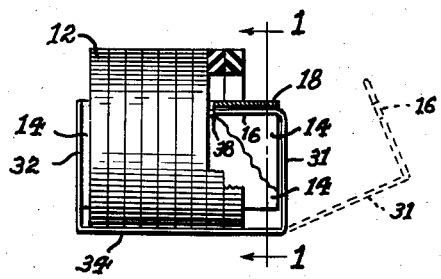
Figure 3 is a side view, with parts broken away, showing a series of rings mounted on the support.

The flaps 14 and the portion 18 to which the flaps are attached form a fairly rigid triangular core on which the rings are adapted to be removably mounted. The sections 31 and 32 serve as end flanges which hold the rings on the triangular core, as best shown in Figure 3. The connecting section 34, which is located between the end flanges and which passes along the outer periphery of the rings, serves as a convenient means for labeling the rings so that anyone looking for a ring of a particular make, size and composition can look at the listing on the section 34.

The flap 16 removably interlocks with the core so as to hold the rings in place on the core during shipment and storage. Projecting ears 35 and 37 are provided on the flap, as shown in Figure 2, for releasably engaging within the apertures 36 and 38 respectively formed in the side walls of the core. However, the flap 16 may readily be pulled out, as indicated by the dotted line showing in Figure 3, so as to facilitate removal of one or more of the rings from the core. Thus, the merchant, or in some cases the ultimate consumer of the rings, would keep the unused rings on the support so as to prevent the same from being mixed with rings of other sizes or being lost completely.

By virtue of the above described construction and arrangement of the support 10, it is obvious that a single flat piece of cardboard may be bent into the shape of a loop with one portion of the loop passing through a series of rings and with this one portion provided with flanges for engaging the inner surface of the rings at spaced points so as to hold the rings neatly in alignment with one another.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a support for a series of rings, a one-piece flexible strip having a series of transverse crease lines for facilitating bending the strip into a loop formation, one end of the strip having side flanges bendable along lines perpendicular to said crease lines so as to form a central hollow core on which a series of rings may be supported, and one side of said loop comprising a flat panel for labeling the rings supported thereon.

2. In a support for a series of rings, a one-piece flexible strip having a series of crease lines for facilitating bending the strip into a loop formation, one end of the strip having side flanges bendable along lines perpendicular to said crease lines so as to form a transversely extending triangular core on which a series of rings may be supported with the rings in contact with the support at spaced points, and the other end of said strip having means formed thereon for interlocking engagement with said core.

3. A ring support comprising a central triangular core adapted to pass through the centers of the rings, means for removably holding the rings in place on said triangular core and for labeling the rings thereon including means formed integrally with one side wall of said triangular core and cooperating with said core to form a loop, one portion of said loop comprising a flat panel having data identifying the ring construction.

4. A ring support comprising a central triangular core adapted to pass through the rings, means formed integrally with one side of said triangular core and projecting substantially perpendicular to said one side so as to form an end flange for holding the rings in place on said triangular core, said last named means including a strap adapted to be looped around the outer periphery of said rings and terminating within the interior of said triangular core, said strap and said core having interlocking portions formed thereon.

5. In a combination label and support for a series of rings, a relatively long and narrow strip of bendable material having a series of transversely extending score lines for use in making right angle bends, one end of said strip comprising a relatively wide portion bendable into a hollow core for passing through the center of the rings, and the other end of said strip comprising a relatively narrow flap adapted to interlock within said hollow core.

6. In a combination label and support for a series of rings, a relatively long and narrow strip of bendable material having a series of transversely extending bend lines, one end of said strip comprising a relatively wide portion bendable into a hollow core for passing through the center of the rings, the other end of said strip comprising a relatively narrow flap adapted to interlock with said hollow core, and an intermediate flat portion of the strip being adapted to pass around the outer periphery of the rings so as to hold the same against removal and so as to provide a flat surface on which to place ring size indicia.

7. In a one-piece support for a series of rings, a central hollow core adapted to pass through the rings, and means formed integrally with one end of said core and projecting substantially perpendicular to the axis of said core so as to form an end flange for holding the rings in place on said core, said last named means including a strap adapted to extend along the outer periphery of said rings with the free end of the strap extending into the interior of the other end of said core, said core having apertures formed in the walls thereof and the free end of said strap having projections releasably engaged within said apertures.

HAROLD G. TAYLOR.

REFERENCES CITED

The following references are of record in the file of this patent:

UNITED STATES PATENTS

| Number | Name | Date |
|---|---|---|
| 931,631 | Milhado | Aug. 17, 1909 |
| 1,411,252 | Bassett | Apr. 4, 1922 |